(12) United States Patent
Weaver

(10) Patent No.: US 6,293,440 B1
(45) Date of Patent: Sep. 25, 2001

(54) DISPENSER FOR GRANULAR MATERIALS

(76) Inventor: Steven K. Weaver, 567 Industrial Dr., Carmel, IN (US) 46032

(*) Notice: Subject to any disclaimer, the term of this patent is extended or adjusted under 35 U.S.C. 154(b) by 0 days.

(21) Appl. No.: 09/712,487

(22) Filed: Nov. 14, 2000

(51) Int. Cl.$^7$ ............................................. G01F 11/10
(52) U.S. Cl. ..................................... 222/368; 222/363
(58) Field of Search ............................... 222/363, 368

(56) References Cited

U.S. PATENT DOCUMENTS

| | | | |
|---|---|---|---|
| 1,560,013 | * | 11/1925 | Angelette ........................... 222/363 |
| 1,772,377 | * | 8/1930 | Whittle ............................... 222/148 |
| 2,104,332 | * | 1/1938 | Rohde et al. ...................... 221/106 |
| 2,411,220 | * | 11/1946 | McDargh, Jr. ..................... 222/363 |
| 2,779,512 | * | 1/1957 | Steele et al. ...................... 222/363 |
| 2,841,312 | * | 7/1958 | Bello .................................. 222/363 |
| 3,122,278 | * | 2/1964 | Crozier .............................. 222/363 |
| 3,169,668 | * | 2/1965 | Ziegler .............................. 222/363 |
| 3,204,833 | * | 9/1965 | Weitzner ........................... 222/355 |
| 4,158,374 | * | 6/1979 | Ciuffetti ............................ 222/363 |
| 4,189,066 | * | 2/1980 | Berghahn .......................... 222/48 |
| 4,266,695 | * | 5/1981 | Ruperez ............................ 222/185 |
| 4,989,759 | * | 2/1991 | Gangloff ........................... 222/153 |
| 5,169,036 | * | 12/1992 | Tong .................................. 222/339 |
| 5,222,635 | * | 6/1993 | Chano ............................... 222/306 |
| 5,292,037 | * | 3/1994 | Held .................................. 222/339 |
| 6,059,147 | * | 5/2000 | Yuen et al. ....................... 222/181.3 |

FOREIGN PATENT DOCUMENTS

614173-A5 * 11/1979 (CH) ........................... B65D/83/06

* cited by examiner

Primary Examiner—Joseph A. Kaufman
Assistant Examiner—Frederick C Nicolas
(74) Attorney, Agent, or Firm—Daniel J. O'Connor

(57) ABSTRACT

A dispenser which is specially adapted for use with a container for granular materials such as laxatives. The dispenser includes an outer housing and an open or hollowed-out shaft. The shaft is easily separable from the housing for simplified assembly, disassembly and cleaning. The open shaft has a selected volume for receipt of granular materials. The overall unit is designed so that a certain desired volume of material can be dispensed by turning the shaft to different positions.

1 Claim, 1 Drawing Sheet

DISPENSER FOR GRANULAR MATERIALS

BACKGROUND AND OBJECTS OF THE INVENTION

The present invention is generally related to the dispenser arts and, in particular, to a system and method for dispensing granular materials such as laxatives.

As is known in the art, laxatives are typically sold in cylindrical containers and so it is often difficult to dispense a certain desired amount of the laxative material.

Dispenser units are known in the art but such are typically difficult to use accurately and costly to manufacture for widespread commercial appeal and use.

Accordingly, it is an object of the present invention to demonstrate a novel dispensing unit and method which may be easily used to dispense a desired amount of material.

It is also an object of the invention to set forth a dispensing unit which may be economically mass-produced for widespread commercial appeal.

It is a still further object of the invention to illustrate a dispensing unit which may be easily assembled and disassembled to facilitate cleaning of the unit when desired.

It is also an object of the invention to show a dispensing unit of high'structural integrity for long-life of the overall unit.

These and other objects of the present invention will be apparent to those of skill in the art from the description which follows.

PRIOR ART PATENTS AND DESIGNS

U.S. Pat. Nos. 5,588,563 and 4,429,815 illustrate the prior art designs for powdered and granular materials.

They illustrate systems which are rather difficult to use and apply in practice. Prior art systems are also costly to manufacture and are typically not of a durable construction.

The advantageous structure and method of the present invention is thus believed to be clearly patentable over all known prior art designs.

SUMMARY OF THE INVENTION

The invention comprises an outer housing which is adapted to fit over the end of a laxative container.

The housing has a number of struts and spars to ADD structural integrity to the overall unit.

A hollowed-out shaft is adapted to fit rotatably within the housing.

In practice of the inventive method, the shaft is turned to a desired position so that the hollowed-out portion is filled. Subsequently the shaft is turned to a dispensing position by the user.

In this manner, an exact desired dosage of the material may be easily dispensed.

BRIEF DESCRIPTION OF THE DRAWING FIGURES

FIG. 3 illustrates the various strengthening features of the overall design.

FULL DESCRIPTION OF A PREFERRED EMBODIMENT

Figure 1:
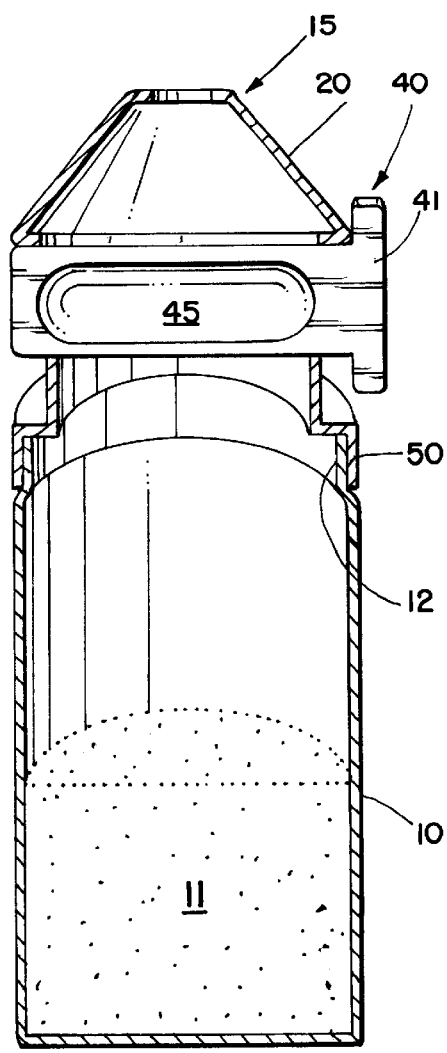
FIG. 1 shows a partial schematic view of the dispenser as used in combination with a container for laxatives.

Referring to the drawing figures, the partial schematic view of FIG. 1 shows a cylindrical container 10 having granular or laxative materials 11 therein.

Container 10 has an upper end 12 to which is mounted a dispenser unit 15.

The dispenser unit 15 comprises a housing 20 which supports a rotatable hollowed-out shaft 40. Shaft 40 has a turning handle 41 and hollowed-out area 45 for receipt of the granular material 11. Right and left portions of the shaft 40 are supported by the housing 20.

The lower end of the dispenser 15 has a flange 50 formed thereon for securely mounting the dispenser unit to the lower container 10.

Further details of the housing unit 20 will be described later herein with reference to FIG. 3.

Figure 2:
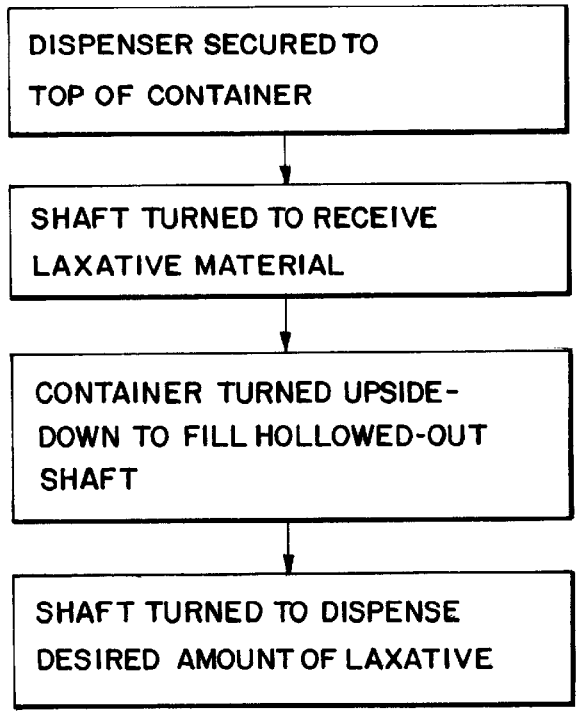
FIG. 2 illustrates the method steps employed in practical use of the invention.

The method steps inherent in the structure of FIG. 1 are diagramed in FIG. 2.

The method steps for practical use of the invention, as shown in FIG. 2, are essentially as follows:

The dispenser unit 15 is secured to the top of container 10 via a flange element 50, Shaft 40 is turned to a position wherein the hollowed-out portion 45 is facing toward the granular material 11, The container 10 and attached dispenser 20 are turned upside-down so that the hollowed-out area 45 is filled with granular material 11, The shaft 40 is manually turned to dispense a desired amount of laxative material from the top of the dispenser unit 20.

In practice of the invention, different sizes for the hollowed-out area could be utilized so that differing volumes could be dispensed.

The materials used for the dispenser and shaft elements would preferably be plastics or rubber/plastic compounds known in the art.

Figure 3:
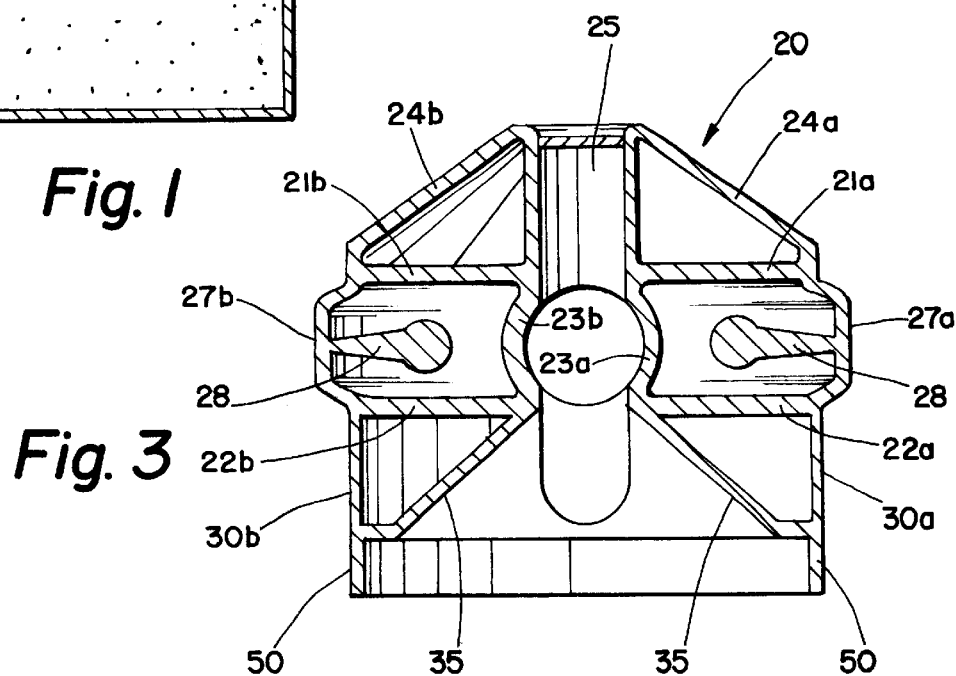
FIG. 3 shows further details of the dispenser housing in a side, cut-away view.

FIG. 3 shows further details of the dispenser housing 20. FIG. 3 is a side, cut-away view of the housing with the shaft removed.

The housing 20 includes horizontal struts, indicated at numerals 21a, 21b, 22a and 22b. The indicated strut elements extend between the outer widened walls 27a and 27b of the dispenser housing 20.

The indicated strut elements 21a, 21b, 22a and 22b also extend inwardly to the shown curved spar elements 23a and 23b. The spar elements 23a and 23b are shaped and sized so as to easily receive the shaft element as previously described.

The housing 20 further includes a lower funnel element 35 for receiving the laxative materials. A dispensing channel 25 is also formed within the housing unit. Angled outer struts 24a and 24b are also shown in FIG. 3.

The widened outer walls 27a and 27b provide for strengthening of the overall unit and facilitate manual grasping of the unit during installation and use.

A pair of internally strengthening wings 28 may also be formed internally of the widened outer walls 27a and 27b to provide additional support for the overall unit.

In the side, schematic view of FIG. 3, the lower attaching element 50 is shown as extending from strut elements indicated at numerals 30a and 30b.

The housing may be fabricated of a single molded part or of multiple parts which are sonically welded together or attached by other known methods.

It will be appreciated that a high-quality, high-strength unit is achieved by use of the various strut and spar configurations. The overall construction enables the described dispensing method to be efficiently practiced.

While a particular system and method have been described, it is intended in this specification to cover all equivalent systems and methods which would reasonably occur to those of skill in the art. The invention is further defined by the claims appended hereto.

As will be appreciated by those of skill in the art, the lower dispenser flange 50 may be attached to the laxative housing 10 by various means including a snug-fit, thread elements or screw or clamp-type fasteners.

The rotatable shaft 40 or housing 20 may include seal elements, not shown, to perform a desired sealing function and also to enable the shaft 40 to be easily removed from the housing when it is desired to clean the components of the dispenser.

I claim:

1. A dispenser(15) for dispensing laxative materials comprising:

an elongated hollowed-out shaft(40) having a handle(41) at one end thereof, said hollowed-out shaft being positioned within a housing (20), said housing including plural horizontal strut element means(21*a*,21*b*,22*a*,22*b*) for supporting curved vertical spar elements(23*a*,23*b*), said curved vertical spar elements supporting said elongated hollowed-out shaft(40), said housing further including funnel means(35) for receiving said laxative materials, said housing further including dispenser port means(25) for dispensing said laxative materials, wherein said housing further includes lower spar means (30*a*,30*b*) for supporting a lower attaching flange(50), widened side wall elements(27*a*,27*b*) and angled upper struts (24*a*,24*b*) for attachment to said dispenser port (25).

* * * * *